United States Patent
Pramod et al.

(10) Patent No.: US 11,290,042 B2
(45) Date of Patent: *Mar. 29, 2022

(54) SUPPLY CURRENT LIMITING OF DC MACHINES

(71) Applicant: STEERING SOLUTIONS IP HOLDING CORPORATION, Saginaw, MI (US)

(72) Inventors: Prerit Pramod, Saginaw, MI (US); Krishna Mohan Pavan Namburi, Saginaw, MI (US); Julie Ann Kleinau, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 325 days.

This patent is subject to a terminal disclaimer.

(21) Appl. No.: 15/603,885

(22) Filed: May 24, 2017

(65) Prior Publication Data

US 2017/0346424 A1 Nov. 30, 2017

Related U.S. Application Data

(60) Provisional application No. 62/341,349, filed on May 25, 2016.

(51) Int. Cl.
*H02P 7/06* (2006.01)
*B62D 5/04* (2006.01)

(52) U.S. Cl.
CPC .............. *H02P 7/06* (2013.01); *B62D 5/0463* (2013.01)

(58) Field of Classification Search
CPC ........ H02P 6/28; H02P 2209/07; H02P 21/22; B65D 5/065; B65D 5/006; B65D 5/0463; B65D 5/0472; B65D 5/0487

USPC ..................... 318/432, 434, 400.01, 811, 599
See application file for complete search history.

(56) References Cited

U.S. PATENT DOCUMENTS

| | | | |
|---|---|---|---|
| 3,762,240 A | 10/1973 | Adams | |
| 6,392,418 B1 * | 5/2002 | Mir ........................ | B62D 5/046 318/716 |
| 7,042,227 B2 * | 5/2006 | Mir ........................ | B62D 5/046 318/432 |

(Continued)

FOREIGN PATENT DOCUMENTS

| | | |
|---|---|---|
| CN | 1141098 A | 1/1997 |
| CN | 1278219 A | 12/2000 |

(Continued)

OTHER PUBLICATIONS

China National Intellectual Property Administration, The First Office Action, Application No. 2017103796401, dated Aug. 21, 2019.

(Continued)

*Primary Examiner* — Rina I Duda
(74) *Attorney, Agent, or Firm* — Dickinson Wright PLLC

(57) ABSTRACT

An embodiment of a control system includes a current command module configured to receive a torque command and output a current command for controlling a direct current (DC) motor, and a supply current limiting module configured to receive a supply current limit as an input and actively compute a motor current limit based on the supply current limit, the supply current limiting module configured to limit the current command based on the motor current limit.

17 Claims, 8 Drawing Sheets

(56) References Cited

U.S. PATENT DOCUMENTS

| | | | | |
|---|---|---|---|---|
| 7,584,816 | B2* | 9/2009 | Miyajima | B62D 5/006 |
| | | | | 180/421 |
| 7,849,957 | B2* | 12/2010 | Hara | B62D 15/0235 |
| | | | | 180/446 |
| 2008/0027609 | A1* | 1/2008 | Aoki | B62D 5/0463 |
| | | | | 701/43 |
| 2009/0079375 | A1 | 3/2009 | Suzuki | |
| 2009/0234538 | A1* | 9/2009 | Ta | B62D 5/046 |
| | | | | 701/41 |
| 2015/0207438 | A1 | 7/2015 | Takami et al. | |
| 2017/0334478 | A1 | 11/2017 | Douglas et al. | |

FOREIGN PATENT DOCUMENTS

| | | | |
|---|---|---|---|
| CN | 1675484 | A | 9/2005 |
| CN | 101044341 | A | 9/2007 |
| CN | 200974476 | Y | 11/2007 |
| CN | 101314361 | A | 12/2008 |
| CN | 101397029 | A | 4/2009 |
| CN | 102145708 | A | 8/2011 |
| CN | 102837728 | A | 12/2012 |
| CN | 203734586 | U | 7/2014 |
| JP | H07232650 | A | 9/1995 |
| JP | 2007282478 | A | 10/2007 |

OTHER PUBLICATIONS

Chinese Notification of Reexamination, with English translation, mailed Apr. 1, 2021 for Chinese Application No. 201710379640.1, 11 pages.

* cited by examiner

SUPPLY CURRENT LIMITING OF DC MACHINES

CROSS-REFERENCES TO RELATED APPLICATIONS

This patent application claims priority to U.S. Provisional Patent Application Ser. No. 62/341,349, filed May 25, 2016 which is incorporated herein by reference in its entirety.

BACKGROUND OF THE INVENTION

The present invention relates to methods and systems for controlling or managing DC machines, and more particularly to methods and systems for limiting supply current to DC machines.

Electrical power steering (EPS) systems use an electric motor as an actuator to provide assist to a driver while steering a vehicle and/or to provide vehicle control. Brushed DC machines are widely used in the Electric Power Steering (EPS) industry for low-cost applications and platforms. Electric drive systems employing such machines require fewer sensors and low-cost electronic circuitry and are able to deliver good performance through the entire operating space.

In order to protect the voltage source (e.g., a car battery) to the motor control system, a voltage versus supply current limit is typically imposed. This may be in the form of a table calibrated offline or an online limit that is sent to the motor control system. Given this supply current limit, the motor current command must be modified in order to ensure that the system does not draw any more current than specified at the cost of reduced torque capability, so that the voltage source is protected.

SUMMARY OF THE INVENTION

An embodiment of a control system includes a current command module configured to receive a torque command and output a current command for controlling a direct current (DC) motor, and a supply current limiting module configured to receive a supply current limit as an input and actively compute a motor current limit based on the supply current limit, the supply current limiting module configured to limit the current command based on the motor current limit.

An embodiment of a method of controlling a direct current (DC) motor includes receiving a torque command and outputting a current command for controlling a direct current (DC) motor, receiving a supply current limit as an input, actively computing, by a supply current limiting module, a motor current limit based on the supply current limit, and limiting the current command based on the motor current limit.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
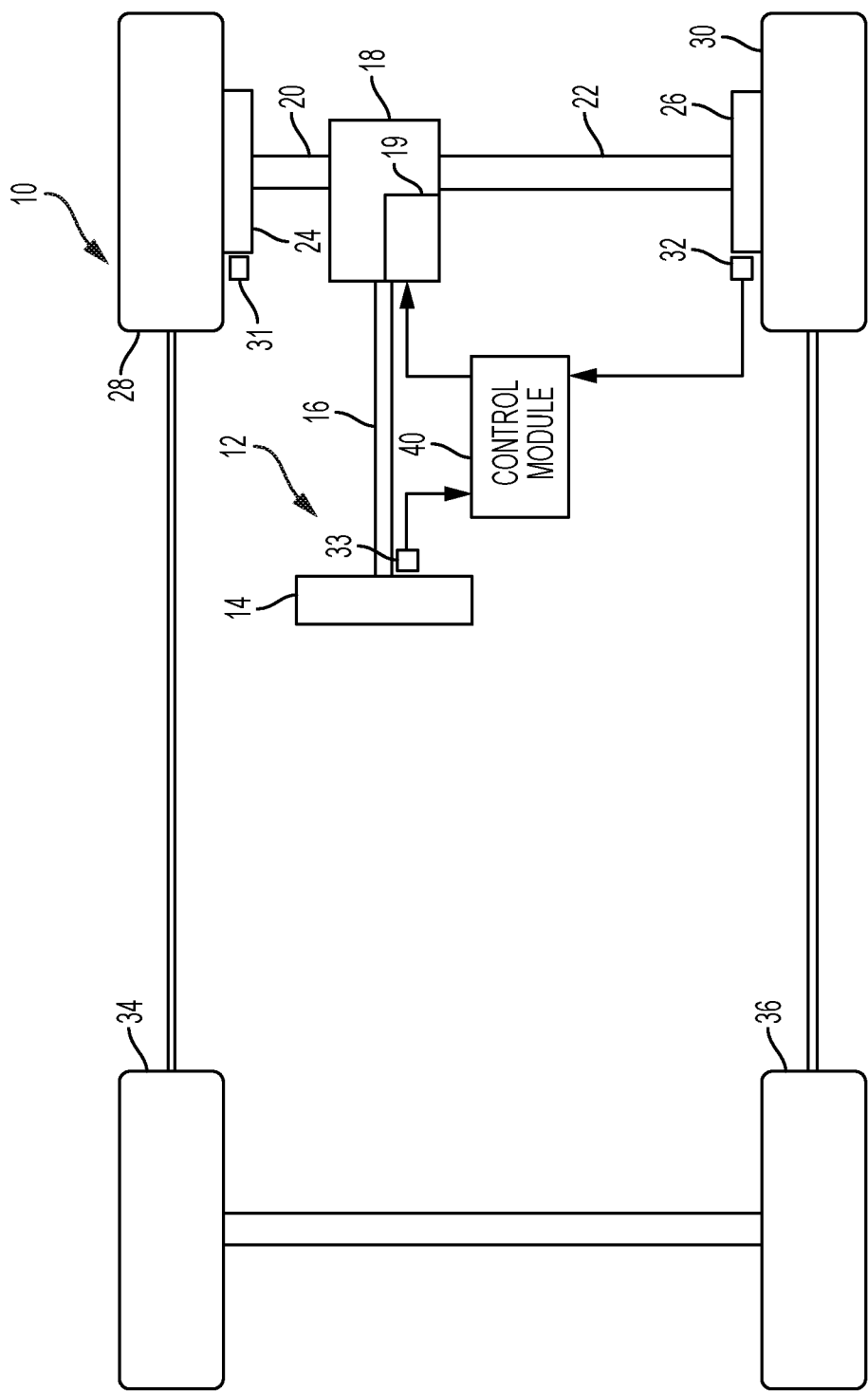
FIG. 1 is a functional block diagram illustrating a vehicle including a steering control and/or assistance system in accordance with an embodiment of the invention.

The following description is merely exemplary in nature and is not intended to limit the present disclosure, application, or uses. It should be understood that throughout the drawings, corresponding reference numerals indicate like or corresponding parts and features.

Referring now to FIG. 1, where the invention will be described with reference to specific embodiments without limiting same, an embodiment of a vehicle 10 including a steering system 12 such as an electrical power steering (EPS) and/or driver assistance system is illustrated. In various embodiments, the steering system 12 includes a handwheel 14 coupled to a steering shaft 16. In the embodiment shown, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a steering actuator motor 19 (e.g., electrical motor) and a rack and pinion steering mechanism (not shown) that may be coupled through the steering shaft 16 to the steering actuator motor and gearing. During operation, as the handwheel 14 is turned by a vehicle operator, the motor of the steering assist unit 18 provides the assistance to move the tie rods 20, 22 which in turn moves steering knuckles 24, 26, respectively, coupled to roadway wheels 28, 30, respectively of the vehicle 10.

The actuator motor 19 is a direct current (DC) electric machine or motor. In one embodiment, the motor 19 is a brushed DC motor. The brushed DC motor includes a stator and a rotor. The stator includes a brush housing having a plurality of circumferentially spaced brushes disposed about a commutator, each brush having a contact face that is in electrical contact with the commutator. Although embodiments described herein are applied to a permanent magnet brushed DC motor, they are not so limited and may be applied to any suitable DC machine.

As shown in FIG. 1, the vehicle 10 further includes various sensors that detect and measure observable conditions of the steering system 12 and/or of the vehicle 10. The sensors generate sensor signals based on the observable conditions. In the example shown, sensors 31 and 32 are wheel speed sensors that sense a rotational speed of the wheels 28 and 30, respectively. The sensors 31, 32 generate wheel speed signals based thereon. In other examples, other wheel speed sensors can be provided in addition to or alternative to the sensors 31 and 32. The other wheel speed sensors may sense a rotational speed of rear wheels 34, 36 and generate sensor signals based thereon. As can be appreciated, other wheel sensors that sense wheel movement, such as wheel position sensors, may be used in place of the wheel speed sensors. In such a case, a wheel velocity and/or vehicle velocity or speed may be calculated based on the wheel sensor signal. In another example, the sensor 33 is a torque sensor that senses a torque placed on the handwheel 14. The sensor 33 generates torque signals based thereon. Other sensors include sensors for detecting the position (motor position) and rotational speed (motor velocity or motor speed) of the steering actuator motor or other motor associated with the steering assist unit 18.

A control module 40 controls the operation of the steering system 12 based on one or more of the sensor signals and further based on the steering control systems and methods of the present disclosure. The control module may be used as part of an EPS system to provide steering assist torque and/or may be used as a driver assistance system that can control steering of the vehicle (e.g., for parking assist, emergency steering control and/or autonomous or semi-autonomous steering control).

Aspects of embodiments described herein may be performed by any suitable control system and/or processing device, such as the motor assist unit 18 and/or the control module 40. In one embodiment, the control module 40 is or is included as part of an autonomous driving system.

A processing or control device, such as the control module 40, is configured to control a DC motor such as a brushed DC motor (e.g., the motor 19) according to a control method. Aspects of the control method include executing an algorithm for actively limiting the supply current draw based on operating conditions of the DC motor and/or other components of a system that includes a DC motor (e.g., an EPS system). A supply current limit is translated to equivalent motor current limit values or curves by solving power equations of a voltage loop defined by a motor control system and the DC motor. Thereafter, the motor current limits are additionally imposed on the system using an algorithm for motor current limiting. The control method provides an added function for active supply current limiting, which determines the motor current limits for ensuring that supply current limits are met. The motor current limits generated by this algorithm may serve as additional limits to other limiting schemes presently used for DC machines.

Figure 2:
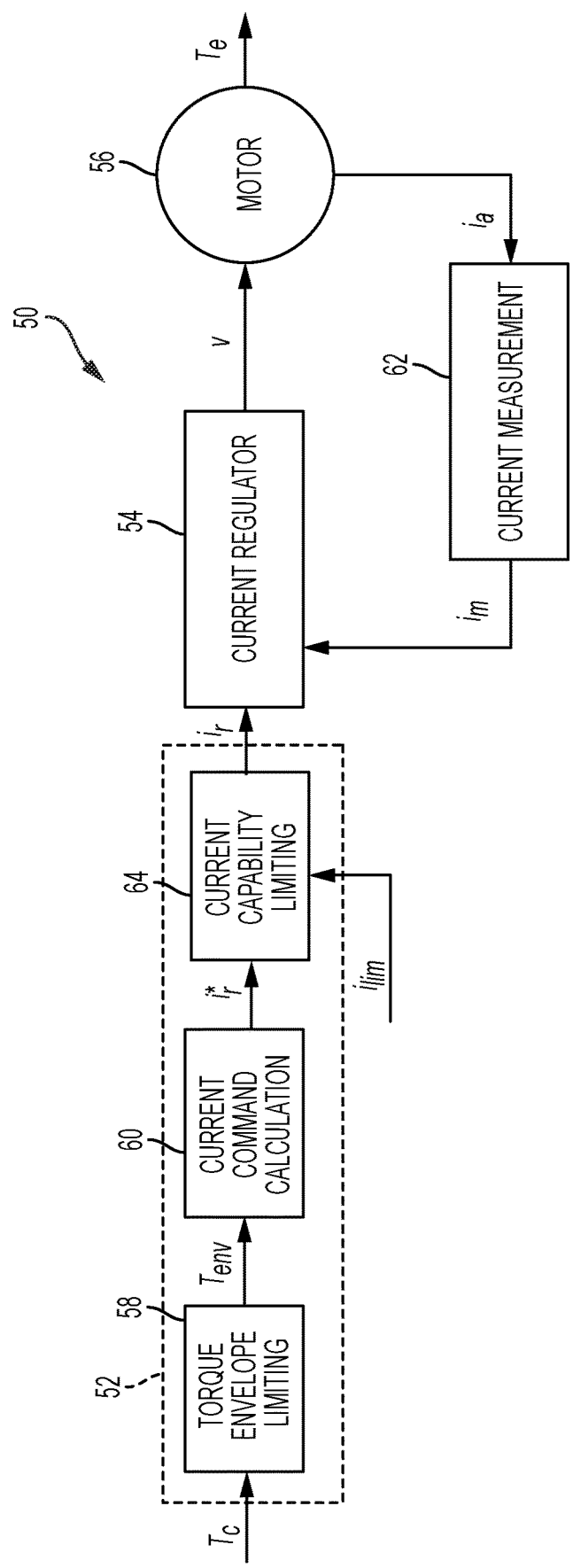
FIG. 2 is a schematic illustrating components, modules and functions of a DC motor control system in accordance with an embodiment of the invention.

Referring now to FIG. 2, a dataflow diagram illustrates an exemplary embodiment of a control device or system 50 for controlling a DC motor, such as a brushed DC motor. The control system 50, in one embodiment, is or includes an EPS control system such as the control module 40 of FIG. 1. In various embodiments, the control device or system (e.g., the module 40) can include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. Inputs to the control module 40 can be generated from sensors such as the sensors 31, 32, 33 (FIG. 1) of the vehicle 10 (FIG. 1), can be received from other control modules (not shown) within the vehicle 10 (FIG. 1), can be modeled, and/or can be predefined.

In the example of FIG. 2, the control system 50 includes various modules or sub-modules such as a current command module 52 that receives a torque command ($T_c$) and outputs a current command to a current regulator 54 used for controlling a brushed DC motor 56. The current command module 52 includes a torque envelope limiting module 58 that outputs an enveloped torque command ($T_{env}$) to a current command calculation module 60. A current command ($i_r$) is sent from the current command module 52 to the current regulator 54 that applies a voltage to the DC motor 56 based on the current command. For example, the current regulator 54 generates a voltage command (v) using the current command, which can be converted to a pulse width modulation (PWM) signal that is transmitted to the DC motor via a power converter such as an H-bridge. A current measurement module 62 measures the current produced by the DC motor 56, i.e., a motor current ($i_a$), and outputs a measured current value ($i_m$) to the current regulator 60.

In one embodiment, the control system 50 includes a current capability limiter or current capability limiting module 64 that receives an external motor current limit ($i_{lim}$), along with the other signals, and limits the enveloped torque command based on the current limit $i_{lim}$. The current limiting module 64 can be connected to or include functionality that further limits the enveloped torque command to the capability limit of the motor 56.

Figure 3:
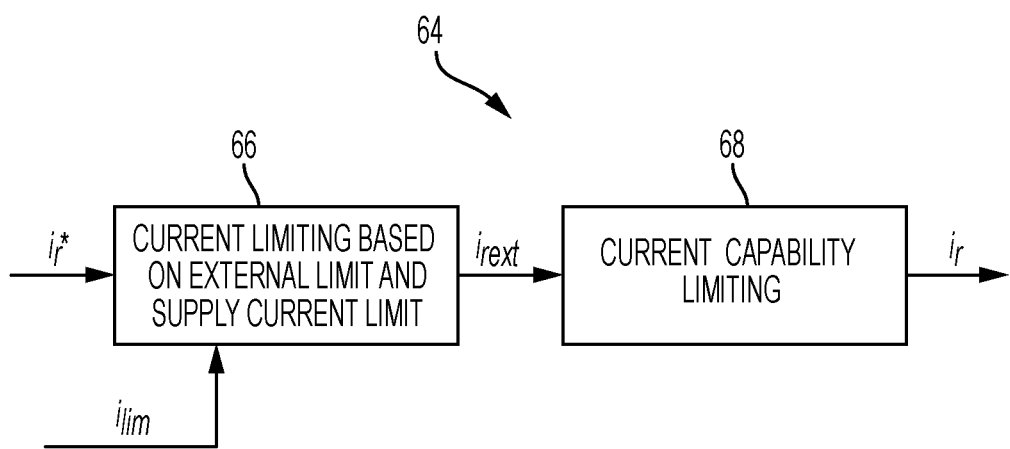
FIG. 3 depicts aspects of a current capability limiting method that can be performed by the motor control system of FIG. 2.

FIG. 3 shows an embodiment of the supply current limiting module 64. In this embodiment, the current capability limiting module 64 receives a current command ($i_r^*$) from the current command calculation module 60 and an externally provided current limit ($i_{lim}$), and first limits the current to a first limited current value ($i_{rext}$) as shown by block 66 (e.g., via a current limiting module that is part of or connected to the current capability limiting module 64). The current command ($i_r^*$) may be first limited to the externally provided limit ($i_{lim}$), which may in some instances be a calibration, based on the following logic:

$$i_{rext} = \begin{cases} \sigma(i_r^*)\min(|i_r^*|, i_{lim}), & |i_r^*| \geq i_{lim} \\ i_r^*, & |i_r^*| > i_{lim} \end{cases}$$

The limited current value ($i_{rext}$) is then compared with capability curves of the DC machine or motor and further limited, as shown by block 68, to ensure that the control system 50 determines optimal current commands based on the operating conditions of the machine. Note that the steady state voltage-current equation is used for capability computation.

Figure 4:
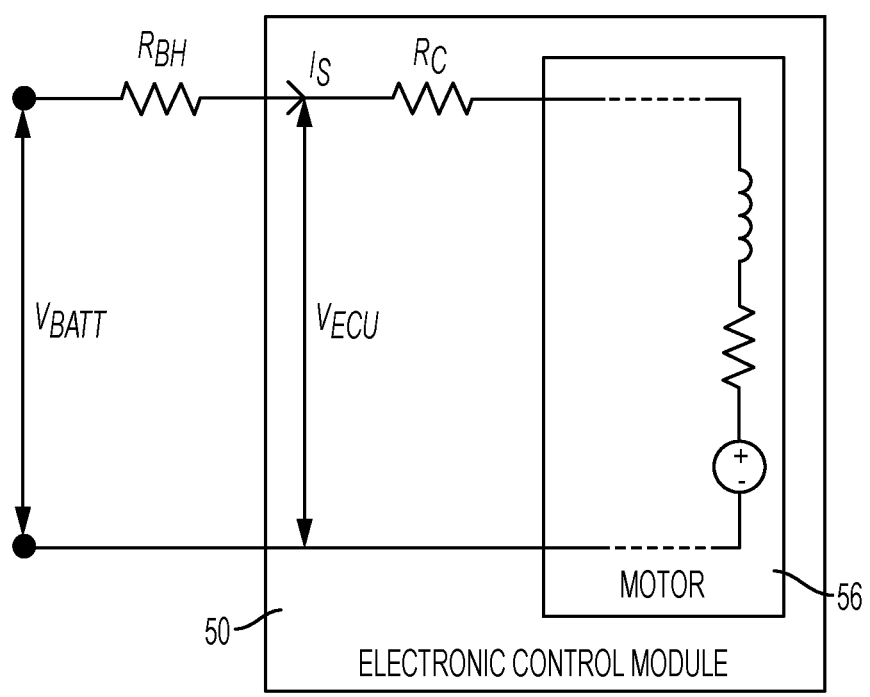
FIG. 4 depicts an example of a DC motor control system and a voltage loop defined by a power source and a DC motor.

In one embodiment, the current capability module 64 (or other suitable processor) is configured to further limit the current command using motor current limits that are computed based on electrical properties of the control system 50 and the motor 56. When an additional supply current limit is imposed on the system 50, the corresponding motor current limits that will ensure that the provided supply current ($I_s$) is not exceeded can be determined online. The power flow of a motor control system (e.g., the system 50) for a brushed DC motor (e.g., the motor 54) control system is shown in FIG. 4. The system 50 and the motor 54 define a voltage loop that includes the voltage across a battery and the voltage across the motor 54.

For a given battery voltage ($V_{BATT}$), and a measurement of the voltage input ($V_{ECU}$) to the system 50, the power equations may be solved to obtain motor current limits. The power balance equation of this system may be written as follows.

$$V_{ECU}I_s - R_c I_s^2 = P_e$$

where $R_c$ is the controller input resistance and $P_e$ is the electrical power input to the motor control system. The expression for $P_e$ may be represented as follows:

$$P_e = v_m i_m$$
$$= R_m i_m^2 + K_e \omega_m i_m + v_B i_m$$

where $v_m$ is the motor voltage, $i_m$ is the motor current, $R_m$ is the electrical resistance of the motor circuit (e.g., including the motor 50 and power converter circuitry, not shown), $\omega_m$ is the rotational speed of the motor 50, and $v_B$ is the brush drop voltage. $K_e$ is a motor voltage or torque constant.

In the above equations, the brush drop voltage ($v_B$) is a nonlinear function of the current ($i_m$) and is mathematically expressed as follows:

$$v_B = \sigma(i_m) V_0 \left(1 - e^{\frac{-|i_m|}{I_0}}\right)$$

where $V_0$ and $I_0$ represent the brush drop voltage and current variables, respectively. Thus, the expanded power equation may be written as follows.

$$R_m i_m^2 + K_e \omega_m i_m + \sigma(i_m) V_0 \left(1 - e^{\frac{-|i_m|}{I_0}}\right) i_m = V_{ECU} I_s - R_c I_s^2$$

Thus, given a supply current limit ($i_{slim}$), the roots of the aforementioned equation may be determined. Due to the nonlinear nature of the equation, an iterative solver may be used to determine the roots. The roots of the following polynomial may be determined:

$$f(i_m) = R_m i_m^2 + K_e \omega_m i_m + \sigma(i_m) V_0 \left(1 - e^{\frac{-|i_m|}{I_0}}\right) i_m - V_{ECU} I_{slim} + R_c I_{slim}^2$$

Since the equation for $f(i_m)$ is quadratic in nature, it will have two distinct roots. From the nature of the polynomial, one root will always be positive and the other will be negative. Thus, in order for the solver to correctly determine the roots, end points ($i_{minp}$) and ($i_{maxp}$) for the two roots should be selected carefully. The following end points may be selected for determining the maximum positive motor current limit ($i_{mp}$):

$$i_{minp} = 0$$

$$i_{maxp} = (1+k)\frac{(-(K_e\omega_m - V_0) + \sqrt{(K_e\omega_m - V_0)^2 + 4R_m(V_{ECU}I_{slim} - R_c I_{slim}^2)}}$$

Similarly, the following end points ($i_{minn}$) and ($i_{maxn}$) may be selected for determining the negative motor current limit ($i_{mn}$):

$$i_{minn} = (1+k)\frac{(-(K_e\omega_m + V_0) - \sqrt{(K_e\omega_m + V_0)^2 + 4R_m(V_{ECU}I_{slim} - R_c I_{slim}^2)}}$$

$$i_{maxn} = 0$$

where k is a scale factor to make the end points bigger than base values, and should be chosen appropriately in order to ensure convergence. Note that other ways to determine the initial end points may also be implemented instead of the aforementioned values.

Figure 5:
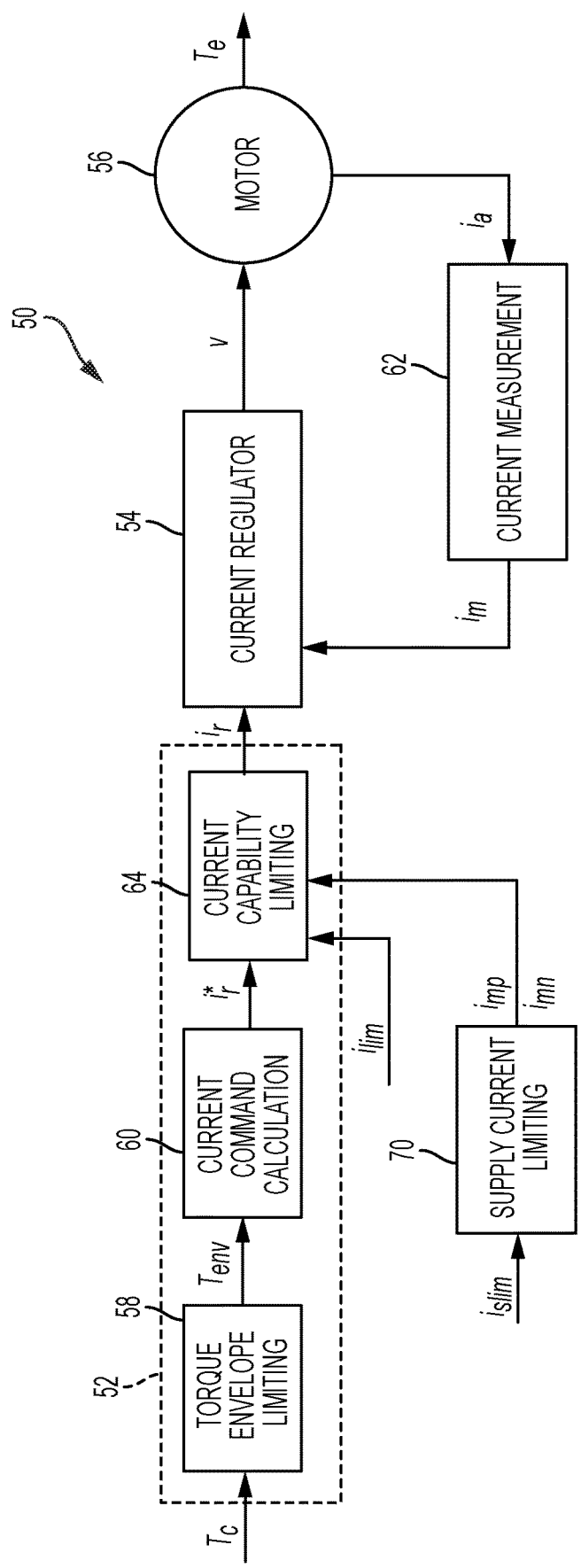
FIG. 5 depicts aspects of a supply current limiting method that can be performed by the motor control system of FIG. 2.

FIG. 5 depicts an embodiment of the motor control system 50 that includes modules or other components that execute a motor control algorithm or otherwise perform a motor control method. The motor control method is performed by the system 50 or other suitable processing device or system.

In the motor control method, a supply current limiting module 70 receives a supply current limit value ($i_{slim}$) and calculates motor current limits $i_{mn}$ and $i_{mp}$ as described above. The motor current limits ($i_{mn}$) and ($i_{mp}$) are input to the current capability limiting module 64, which generates a current command ($i_r$) that is used by the current regulator 54 to provide a voltage command to the motor 56. In one embodiment, the motor current limits $i_{mn}$ and $i_{mp}$ are input from the supply current limiting module 70 to the current capability limiting module 64 as pre-limits. The current capability module 64 may further limit a current value ($I_{rext}$) calculated by the current capability limiting module 64 based on motor capability.

In one embodiment, the supply current limiting module 70 implements the aforementioned equations to obtain the motor current limits ($i_{mn}$) and ($i_{mp}$), which are input to the current capability limiting module 64 or other suitable component or module. The following logic is performed:

$$i_{rext} = \begin{cases} i_{mp}, & i_r^* \geq \min(i_{mp}, i_{lim}) \\ i_r^*, & i_{mn} < i_r^* < i_{mp} \\ i_{mn}, & i_r^* \leq \max(i_{mn}, -i_{lim}) \end{cases}$$

where $i_{lim}$ is the external motor current limit, and $i_{rext}$ is a current limit value or signal, which may optionally be further limited to the capability of the motor, as described above.

In one embodiment, an estimate of the controller input resistance ($R_c$) is used to generate the current limit signal ($i_{rext}$). An accurate estimate may be obtained by estimating the temperature in the appropriate part of the control system. However, if very accurate supply current limiting is not required, an overestimated high fixed value of $R_c$ may be chosen in order to be conservative.

It is noted that the limits calculated as described herein may be a calibration, a continuously or periodically changing signal or a function of other signals (e.g., voltage). It is also noted that the algorithms and methods described herein may be implemented as a software solution without requiring additional hardware.

Figure 6:
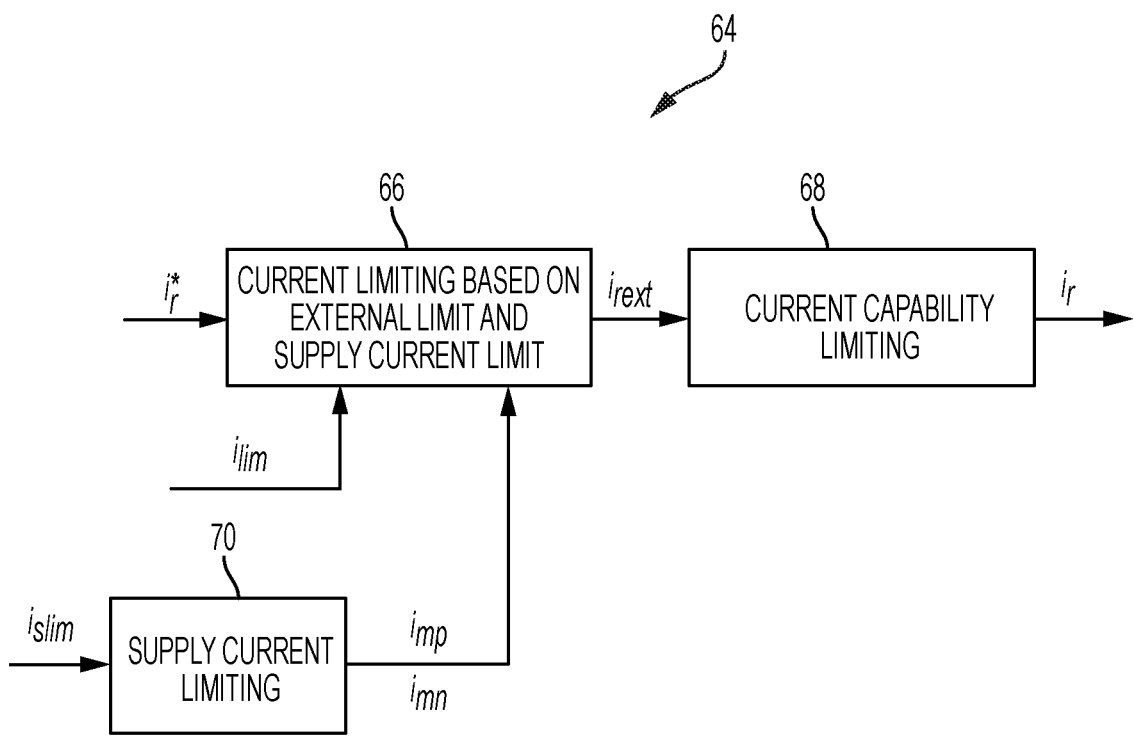
FIG. 6 depicts aspects of a current capability limiting method that can be performed by the motor control system of FIG. 2.

FIG. 6 shows an embodiment of the current capability limiting module 64. In this embodiment, the current capability limiting module 64 receives the current command ($i_r^*$), an externally provided limit ($i_{lim}$) and motor current limits ($i_{mp}$) and ($i_{mn}$). The current capability limiting module 64 outputs a limited current value rext ($i_{rext}$) based on the external limit ($i_{lim}$) and motor current limits ($i_{mp}$) and ($i_{mn}$), and then further limits the limited current value ($i_{rext}$) based on motor capability using power equations as discussed above.

It is noted that, although the current capability module 64 is shown as using all of the externally provided limit, the motor current limits and the motor capability limit, embodiments described herein are not so limited. The current capability module 64 or other suitable processor can limit or adjust a current command based on one or more of the above-described limits.

Figure 7:
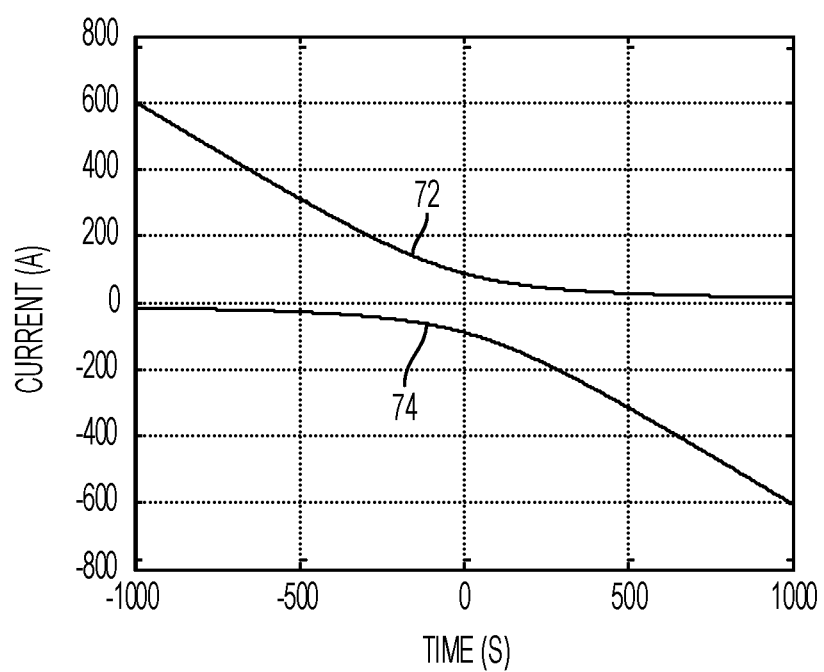
FIG. 7 depicts an example of simulation results based on DC motor current control according to embodiments described herein.
Figure 8:
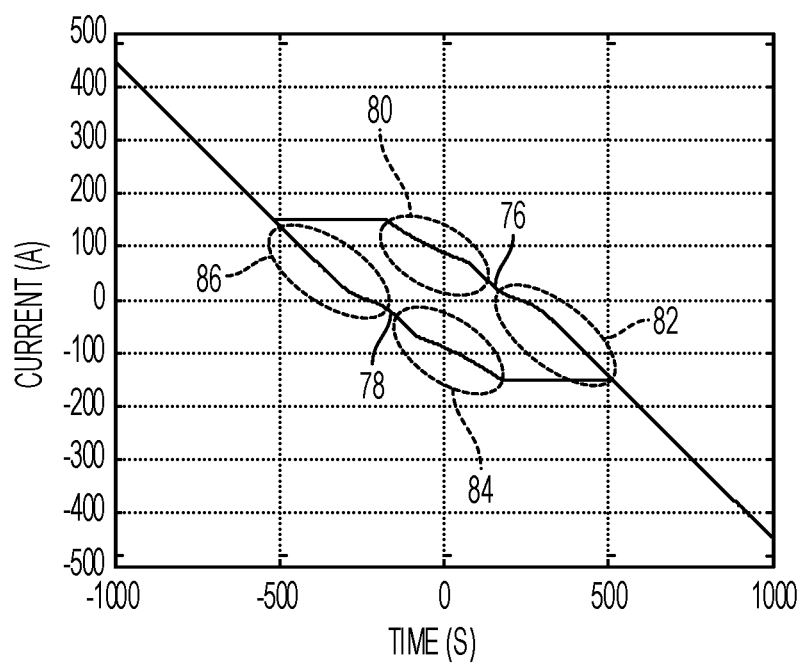
FIG. 8 depicts another example of simulation results based on DC motor current control according to embodiments described herein.

FIGS. 7 and 8 show examples of simulation results using the above described embodiments, which show supply current limits and motor capability current limits. A processing device in a control system, such as the current capability limiting module 64, computes motor current limits ($i_{mp}$) and ($i_{mn}$) based on power equations as discussed above. Simulation results based on this computation are shown as motor current limit curves 72 and 74 in FIG. 7. In this example, the motor current limit curve 72 represents the positive motor current limit $i_{mp}$, and the motor current capability limit curve 74 represents the negative motor current imit $i_{mn}$.

FIG. 8 shows an example of simulation results that show motor current limit curves 76 and 78 calculated based on motor current limits ($i_{mp}$) and ($i_{mn}$), an external limit and based on motor capability limits computed as discussed above. The motor current limit curves 76 and 78 incorporate the motor current limit curves 72 and 74 and motor capability limits or limit curves. In this example, the motor current limit curve 76 has a section 80 that corresponds to the current limit curve 72, and a section 82 that corresponds to motor capability limits. Likewise, the motor current limit curve 78 has a section 84 that corresponds to the curve 74, and a section 86 that corresponds to motor capability limits. The motor current limit curves 76 and 78 are also limited by external limits, as shown by horizontal lines at about +150 Amps and about −150 Amps. The processing device and/or system can arbitrate between direct motor current limiting based on motor capability and supply current limiting based on external limits if desired.

Embodiments described herein provide a number of benefits and technical effects. Embodiments provide effective techniques for limiting the supply current draw of an EPS or other system that utilizes a DC motor, which are important for protecting a battery or other power source.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A control system comprising:
a supply current limiting module configured to receive a supply current limit and actively compute a motor current limit based on a non-linear function of the supply current limit; and
a current command module configured to receive a torque command, to receive the motor current limit from the supply current limiting module, to compute an initial current command, and to compute a limited current command, for controlling a brushed direct current (DC) motor, based on the torque command, the motor current limit, and the initial current command.

2. The system of claim 1, further comprising a current regulator configured to apply a voltage to the brushed DC motor based on the limited current command.

3. The system of claim 1, wherein the supply current limiting module is further configured to compute the motor current limit based on a voltage loop defined by a motor control system and the brushed DC motor.

4. The system of claim 1, wherein the supply current limiting module is further configured to compute the motor current limit using a power equation that is based on operating conditions of the brushed DC motor.

5. The system of claim 4, wherein the power equation is represented by:

$$V_{ECU}I_s - R_c I_s^2 = P_e,$$

wherein $V_{ECU}$ is a voltage input to a motor control system, $I_s$ is a supply current to the brushed DC motor, $R_c$ is an input resistance of the motor control system, and $P_e$ is an electrical power input to a motor control system and is based on the motor current limit.

6. A control system comprising:
a supply current limiting module configured to receive a supply current limit and actively compute a motor current limit based on the supply current limit; and
a current command module configured to receive a torque command, to receive the motor current limit from the supply current limiting module, to compute an initial current command, to compute a motor current limit, and to compute a limited current command, for controlling a brushed direct current (DC) motor, based on the torque command, the motor current limit, and the initial current command; and
wherein the supply current limiting module is configured to compute the motor current limit using a non-linear power equation that is based on operating conditions of the brushed DC motor, wherein the power equation is represented by:

$$V_{ECU}I_s - R_c I_s^2 = P_e,$$

wherein $V_{ECU}$ is a voltage input to a motor control system, $I_s$ is a supply current to the brushed DC motor, $R_c$ is an input resistance of the motor control system, and $P_e$ is an electrical power input to a motor control system, and $P_e$ is represented by:

$$\begin{aligned}P_e &= v_m i_m \\ &= R_m i_m^2 + K_e \omega_m i_m + v_B i_m\end{aligned}$$

$v_m$ is a motor voltage, $i_m$ is a motor current based on the motor current limit, $R_m$ is an electrical resistance of the DC motor, $\omega_m$ is a rotational speed of the brushed DC motor, $v_B$ is a brush drop voltage, and $K_e$ is a constant.

7. The system of claim 1, wherein the motor current limit includes a maximum motor capability curve and a minimum motor capability curve.

8. The system of claim 1, wherein the current command module comprises a current capability limiting module configured to receive an external current limit, and to compute the limited current command additionally based on the external current limit.

9. The system of claim 1, wherein the supply current limiting module is part of an electrical power steering system of a vehicle.

10. A method of controlling a brushed direct current (DC) motor, comprising:
receiving a supply current limit as an input of a supply current limiting module;
actively computing, by the supply current limiting module, a motor current limit based on a non-linear function of the supply current limit;

receiving a torque command and the motor current limit at a current command module;

computing, at the current command module, an initial current command;

computing, at the current command module, a limited current command based on the torque command, the motor current limit, and the initial current command; and controlling the brushed DC motor based on the limited current command.

11. The method of claim 10, further comprising, applying, by a current regulator, a voltage to the brushed DC motor based on the limited current command.

12. The method of claim 10, wherein the actively computing the motor current limit comprises computing based on t a voltage loop defined by a motor control system and the brushed DC motor.

13. The method of claim 10, wherein the actively computing the motor current limit comprises computing using a power equation that is based on operating conditions of the brushed DC motor.

14. The method of claim 13, wherein the power equation is represented by:

$$V_{ECU}I_s - R_cI_s^2 = P_e,$$

wherein $V_{ECU}$ is a voltage input to a motor control system, $I_s$ is a supply current to the brushed DC motor, $R_c$ is an input resistance of the motor control system, and $P_e$ is an electrical power input to a motor control system and is based on the motor current limit.

15. The method of claim 14, wherein the electrical power input $P_e$ is represented by:

$$\begin{aligned}P_e &= v_m i_m \\ &= R_m i_m^2 + K_e \omega_m i_m + v_B i_m\end{aligned},$$

$v_m$ is a motor voltage, $i_m$ is a motor current based on the motor current limit, $R_m$ is an electrical resistance of the DC motor, $\omega_m$ is a rotational speed of the brushed DC motor, $v_B$ is a brush drop voltage, and $K_e$ is a constant.

16. The method of claim 10, wherein the motor current limit includes a maximum motor capability curve and a minimum motor capability curve.

17. The method of claim 10, wherein the supply current limiting module is part of an electrical power steering system of a vehicle.

* * * * *